(12) United States Patent
Cox, Jr. et al.

(10) Patent No.: US 8,527,963 B2
(45) Date of Patent: Sep. 3, 2013

(54) SEMAPHORE-BASED MANAGEMENT OF USER-SPACE MARKERS

(75) Inventors: Stan S. Cox, Jr., Raleigh, NC (US); Frank Ch. Eigler, Brantford (CA)

(73) Assignee: Red Hat, Inc., Raleigh, NC (US)

( * ) Notice: Subject to any disclaimer, the term of this patent is extended or adjusted under 35 U.S.C. 154(b) by 595 days.

(21) Appl. No.: 12/788,743

(22) Filed: May 27, 2010

(65) Prior Publication Data
US 2011/0296387 A1 Dec. 1, 2011

(51) Int. Cl.
*G06F 9/44* (2006.01)
(52) U.S. Cl.
USPC ........... 717/130; 717/124; 717/127; 717/129; 717/131
(58) Field of Classification Search
None
See application file for complete search history.

(56) References Cited

U.S. PATENT DOCUMENTS

| | | | |
|---|---|---|---|
| 6,681,384 B1 * | 1/2004 | Bates et al. | 717/129 |
| 7,421,681 B2 * | 9/2008 | DeWitt et al. | 717/128 |
| 7,877,642 B2 * | 1/2011 | Ding et al. | 717/133 |
| 8,056,068 B2 * | 11/2011 | Akulavenkatavara et al. | 717/159 |
| 2006/0112377 A1 * | 5/2006 | Nacul et al. | 717/140 |
| 2007/0266376 A1 * | 11/2007 | Yim et al. | 717/129 |
| 2011/0072418 A1 * | 3/2011 | Kalamegham et al. | 717/128 |

* cited by examiner

*Primary Examiner* — Isaac Tecklu
(74) *Attorney, Agent, or Firm* — Lowenstein Sandler LLP

(57) ABSTRACT

A probe management system identifies a probe module for an application, which includes a semaphore table that has entries for a plurality of probe points in the application. An entry includes a semaphore variable value for a probe point. The probe management system identifies one or more probe points that are to be activated from an introspection user script. The user script is for examining the execution of the application at one or more of the probe points in the application. The probe management system adjusts the semaphore variable values for the identified probe points in the semaphore table in the probe module to represent to the application that a probe point is to be activated and causes the application to activate the identified probe points based on the adjusted semaphore variable values in the semaphore table.

20 Claims, 6 Drawing Sheets

US 8,527,963 B2

SEMAPHORE-BASED MANAGEMENT OF USER-SPACE MARKERS

TECHNICAL FIELD

Embodiments of the present invention relate to analyzing the performance of an application. Specifically, the embodiments of the present invention relate to using semaphore variables to manage the activation of probe points of the application.

BACKGROUND

A user, such as a system administrator, a software developer, and a performance analysis staff member, can use an introspection tool, such as the SystemTap introspection tool for the Linux® operating system, to examine the activities of a user application as it is executing. Examples of user applications include database management applications, such as MySQL® and PostgreSQL. Many user application developers include user-space markers, also known as probe points, in the user application source code to identify events in the application code which allow a user to examine the state of the application at that point in time when the application is running.

Application developers may embed a large number of probe points in the application code and traditionally, an application sets up all of its probe points for use, which can result in a significant amount of overhead associated with the set up process. Moreover, a user that is examining the application may not be interested in examining the application at all of the probe points, but rather, at only a few of the probe points. An application that sets up all of its probe points, thus, performs unnecessary set up processes which can place a burden on the application's performance.

In addition, an introspection tool can run a user application under its control. That is, when an application 'hits' a probe point during its execution, the application relinquishes control to the introspection tool to allow the introspection tool to examine the probe point at the time the probe point is 'hit'. A user, however, may run an application without running the introspection tool. For example, a user may run MySQL® without running SystemTap. In such a case, the probe points are not being used, and yet, an application may still set up all of its probe points for use. The application executes run-time probe setup code for all of the probe points and stores the incoming probe arguments in a location which an introspection tool can subsequently access, even when an introspection tool is not running, and even when a user is not interested in examining the application at all of the probe points.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for using semaphore variables to manage the activation of probe points of a user application. A probe management system identifies a probe module for an application. The probe module includes a semaphore table that has entries for a plurality of probe points in the application. An entry includes a semaphore variable value for a probe point. The probe management system identifies one or more probe points that are to be activated from an introspection user script. The user script is a script for examining the execution of the application at one or more of the probe points in the application. The probe management system adjusts the semaphore variable values for the identified probe points in the semaphore table in the probe module to represent to the application that a probe point is to be activated. The probe management system causes the application to activate the identified probe points based on the adjusted semaphore variable values in the semaphore table.

Embodiments of the present invention enable an introspection tool to manage the activation of probe points in an application to reduce the application's processing overhead that is associated with setting up the probe points for use. In embodiments of the present invention, an application still sets up probe points for use, but the introspection tool manages when the application performs the set up process and manages which probe points the application is to set up. Having the introspection tool manage the activation of the probe points using semaphore variables helps an application to eliminate the unnecessary set up processes when the introspection tool is not running and when a user is not interested in examining the application at all of the probe points.

Figure 1:
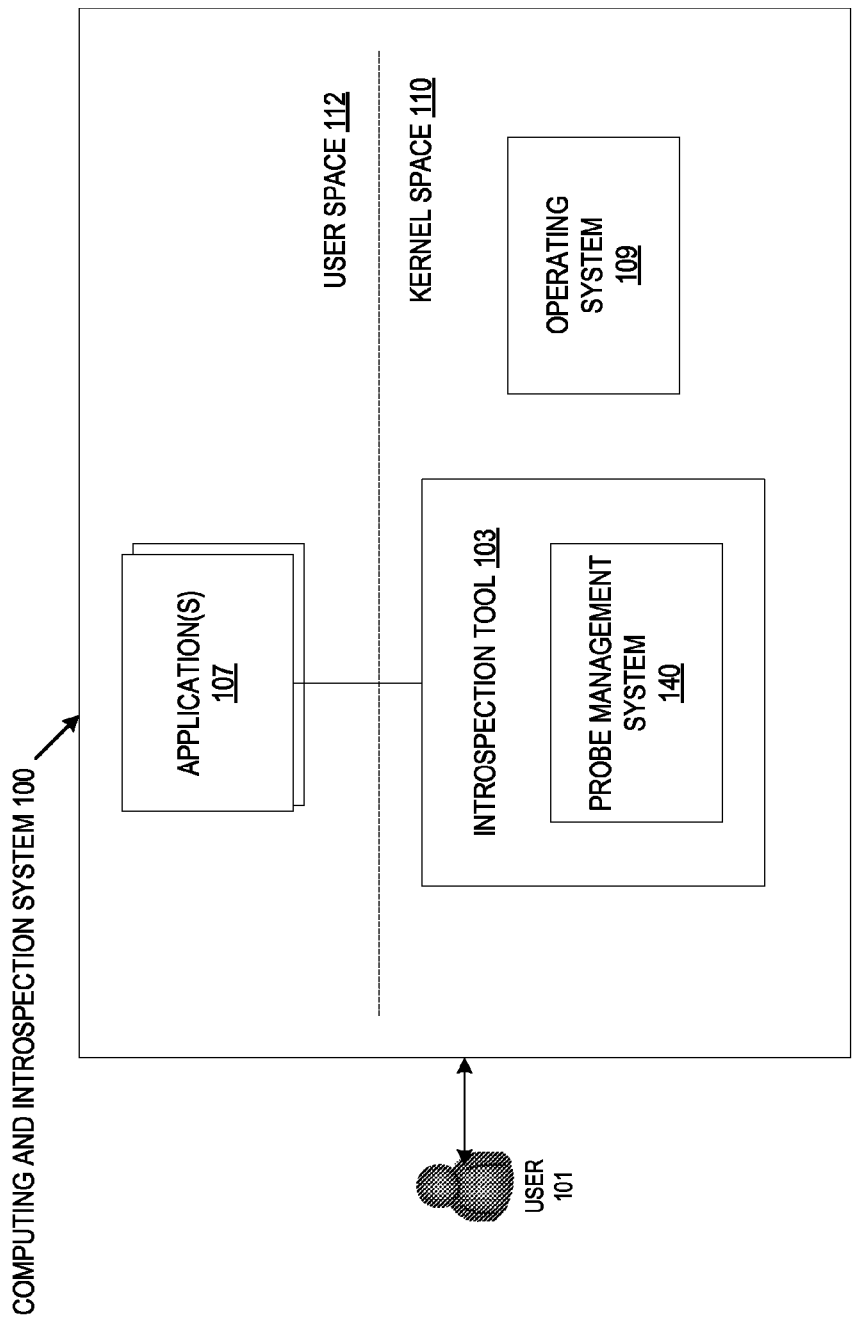
FIG. 1 illustrates an exemplary computing and introspection environment in which embodiments of the present invention may operate.

FIG. 1 illustrates an exemplary computing and introspection system 100 for managing the activation of probe points of an application in accordance with some embodiments of the invention. System 100 includes system memory. The system memory can be divided into regions, such as user space 112 and kernel space 110. The kernel space 110 is reserved for running an operating system 109 (e.g., Linux® OS, Windows® OS, etc.) and an introspection tool 103. The user space 112 is reserved for user mode programs including user application(s) 107. An application 107 can represent one or more applications of any type including, for example, a database management application, such as MySQL® and PostgreSQL, a browser application, a web application, a desktop application, etc.

The computing and introspection system 100 hosts an introspection tool 103 in the kernel space 110 to allow a user 101, such as a system administrator, a software developer, and a performance analysis staff member, to examine and monitor the activities of an application 107 that is executing to help diagnose a performance or functional problem. A computing and introspection system 100 may be a personal computer, a laptop, a PDA, a mobile phone, etc. An example of an introspection tool 103 is the SystemTap introspection tool for the Linux® operating system.

Many user application 107 developers include user-space markers, also known as probe points, in the user application 107 source code that allow a user 101 to examine the state of the application 107 at that point in time when the application 107 is running. Typically, an application 107 sets up all of its probe points for use, even when an introspection tool is not running and even when a user is not interested in examining the application at all of the probe points. Traditionally, the application executes run-time probe setup code for all of the probe points and stores the incoming probe arguments in a location which an introspection tool can subsequently access. It is an unnecessary process to set up all of the probe points when a user in not interested in using all of the probe points or when an introspection tool is not running and the unnecessary set up processes can have a negative affect on the performance of the application.

The introspection tool 103 can include a probe management system 140 to activate the probe points for use when an introspection tool is running and to activate only the probe points that a user is interested in examining. The probe management system 140 can manage when an application is to set up the probe points and which probe points the application is to set up.

Figure 2:
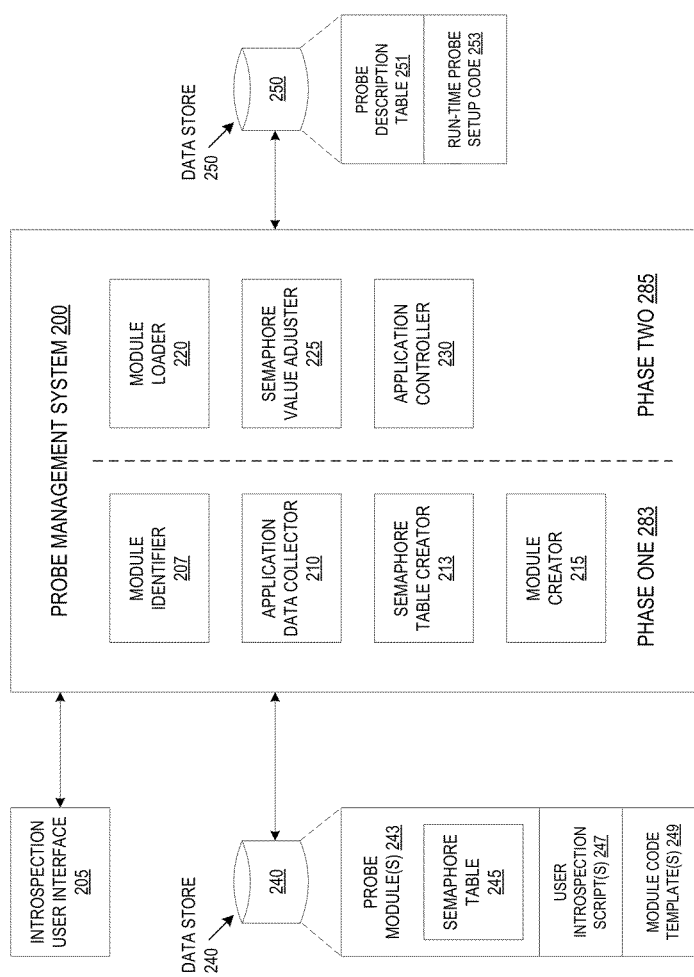
FIG. 2 is a block diagram of one embodiment of a probe management system.

FIG. 2 is a block diagram of one embodiment of a probe management system 200. The probe management system 200 may be the same as the probe management system 140 in the computing and introspection system 100 of FIG. 1. The introspection tool can include a probe management system 200 to dynamically activate only the probe points a user is interested in using when an introspection tool is running.

In one embodiment, system 200 has components operating in two phases. For example, during phase one 283, the system 200 can determine whether a probe module for an application that is to be examined is already stored in a data store 240. The probe module 243 is a stand-alone static kernel module executed by an introspection tool during phase two 285 for dynamically activating the probe points in the application and attaching to the activated probe points. During phase one 283, if the system 200 does not locate a probe module for the application in the data store 240, the system 200 can create a probe module for the application and store it in the data store 240. Phase one 283 can occur when an introspection tool identifies an application which a user may be interested in examining from a user script and creates and stores, and/or identifies a probe module for the application in the data store 240. Phase one 283 can include components, such as a module identifier 207, an application data collector 210, a semaphore table creator 213, and a module creator 215.

During phase two 285, after a probe module 243 for an application is created and stored in a data store 240, and/or identified by the system 200, the system 200 can load the probe module for the application to dynamically activate the probe points, which a user is interested in examining, and attach to the activated probe points. Phase two 285 can occur after the system 200 has created and stored a probe module for the application, and/or identified a probe module for the application in the data store 240. Phase two 285 can include components, such as a module loader 220, a semaphore value adjuster 225, and an application controller 230.

Many user application developers include probe points in the application code to identify events in the application code. When an application is running and 'hits' a probe point that has been activated, the introspection tool gains control of (attaches to) the application at the probe point to, for example, perform measurements for analyzing the application. Many user application developers also include a semaphore variable for a probe point in the application code. A semaphore variable is a variable that can be used to control the activation of a probe point. A semaphore variable can be used as a counter having a value which can be incremented and decremented.

During phase one 283, the module identifier 207 can receive an introspection tool user script (user script) 247 for examining an application and can identify the application that is to be examined from the user script 247. For example, the module loader 200 may receive a user script 247 and may identify that a MySQL® application is to be examined. A user, can use an introspection user interface 205 to write or to select a user script for examining an application. The module identifier 207 can obtain a user script 247 from the data store 240 or a user script that is submitted by a user using the introspection user interface 205. The user interface 205 can be a graphical user interface. The data store 240 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The module identifier 207 can determine whether a probe module 243 for the application is already stored in a data store 240. For example, the system 200 can search the data store 240 for a probe module for the MySQL® application and may identify a probe module 243 for the MySQL® application in the data store 240.

When the system 200 does not locate a probe module 243 for the application in the data store 240, the application data collector 210 can collect probe point data from the application to create a probe module for the application. Examples of probe point data include an address in the application of a probe point and an address in the application of a semaphore variable for a probe point. A compiler, which compiles an application, generates entries in a probe description table 251 that includes probe point data for each probe point in the application. The probe description table 251 can be stored in a data store 250, which is coupled to the system 200, when an application is loaded. The data store 250 can be a persistent storage unit.

Many applications are built to enable introspection tool style probing, such as SystemTap or Dtrace style probing, and are compiled to allow the system 200 access to the probe description table 251. The application data collector 210 can examine the probe description table 251 to determine the addresses in the application of all of the probe points and the addresses of the semaphore variables for the probe points.

The semaphore table creator 213 can create a semaphore table 245 for an application using the probe point data that is collected from the probe description table 251. For example, the application data collector 210 may collect probe point data from a probe description table 251 for a MySQL® application and the semaphore table creator 213 may use the probe point data to create a semaphore table 245 for the MySQL® application. A semaphore table 245 contains an entry for each probe point in an application. An entry can include the address data for the probe point, address data for a semaphore variable for the probe point, and a numeric field for a value for the semaphore variable. The semaphore table creator 213 can assign an initial semaphore variable value, such as zero, for each entry.

The module creator 215 can create an introspection tool probe module (probe module) 243 for an application that includes the semaphore table 245 for the application. A probe module 243 is a stand-alone static kernel module for a particular application. For example, the module creator 215 can create a probe module for a MySQL® application and can create a probe module for a PostgreSQL application.

The system 200 can store module code templates 249 for different user application types in the data store 240. A module code template 249 is a set of instructions for using a semaphore table 245. The module creator 215 can combine a module code template 249, which corresponds to the application that is being examined, with the semaphore table 245 for the application created by the semaphore table creator 213 to create the probe module 243 for the application. The probe module 243 has a semaphore variable table 245 that has entries for all of the probe points in the application. Subsequently, during phase two 285, the module loader 220 can run the probe module 243 to activate the particular probe points in an application that a user is interested in examining. The module creator 215 can store a probe module 243 in the data store 240.

During phase two 285, after the system 200 has created and stored a probe module 243 for an application, and/or identified a probe module 243 for an application in the data store 240, the module loader 220 can load the probe module 243 for the application to manage which probe points an application is to set up for use. The module loader 200 can locate the probe module 243 that corresponds to the application in the data store 240 and run the corresponding probe module 243.

A user script 247 includes functions, which identify probe points, for examining a user application while the application is running. For example, a probe function in a user script 247 identifies a probe point in the application which a user is interested in examining. As part of phase two 285, the semaphore value adjuster 225 can identify the probe points that a user is interested in examining from the user script 247 and can flag the identified probe points in the semaphore table 245 in the probe module 243 that is loaded by the module loader 220. Flagging the identified probe points in the semaphore table 245 can represent to the application which probe points the application is to activate for use.

The semaphore value adjuster 225 can flag the probe points which are to be activated by adjusting the semaphore variable values for the probe points. In one embodiment, a flagged probe point is a probe point that has a non-zero semaphore variable value in the semaphore table. For example, the value adjuster 225 can flag the probe points that were identified from the user script by incrementing their semaphore variable values in the semaphore table from zero to one. The probe management system 200 helps to minimize the overhead costs in setting up the probe points by flagging only the probe points which are to be examined.

An application, such as the database management application MySQL®, can run as a stand-alone application in a computing and introspection system independently from an introspection tool. Alternatively, an application can run with an introspection tool, such that, when an application 'hits' a probe point during its execution, the application relinquishes control to the introspection tool. At that time, the introspection tool can perform various examination and analysis operations, as defined by a user script, on the application at the moment the probe point was 'hit'. When the introspection tool has completed its operations at that particular probe point, the introspection tool returns control to the application to allow the application to continue its execution until the application 'hits' the next probe point.

During phase two 285, the application controller 230 can run the application that a user is interested in examining under the control of the introspection tool. When the application is executing and 'hits' a probe probe during its execution, the application can determine from the semaphore table 245 in the probe module 243 whether the probe point that was 'hit' is flagged to be activated. The application can search the semaphore table 245 for an entry that corresponds to the hit probe point and determine whether the entry has a zero or a non-zero semaphore variable value.

When the application detects a non-zero value, the application executes run-time probe setup code 253 to set up the probe point that was 'hit" for use. The compiler, which compiled the application, generated run-time probe setup code 253 for the application to execute to set up the probe points for use. The run-time probe setup code 253 can be stored in a data store 250 when an application is loaded. For example, the application can arrange all of the arguments for the probe point, arrange the data values that are associated with the probe point, etc., and store the data in, for example, data store 250, which the system 200 can access in order to obtain control of (attach to) the application at the probe point.

When the application detects a zero semaphore variable value, the application bypasses execution of the run-time probe setup code 253 for the probe point. Allowing the application to bypass the execution of the run-time probe setup code 253 removes unnecessary set up processing by the application. The application can continue to run until the application 'hits' another probe point or until the probe management system 200 completes its examination of the application. The application controller 230 can determine that the system 200 has completed examining an application, for example, by determining that there are no remaining probe points in a user script 247 to be examined.

When the system 200 has completed an examination of the application, the semaphore value adjuster 225 can adjust the semaphore variable values in the semaphore table 245 to represent to the application that the particular probe points are no longer being examined. For example, the value adjuster 225 can decrement the semaphore variable values, which were previously incremented, to represent that the probe management system 200 is no longer using the identified probe points for a particular instrumentation session.

Figure 3:
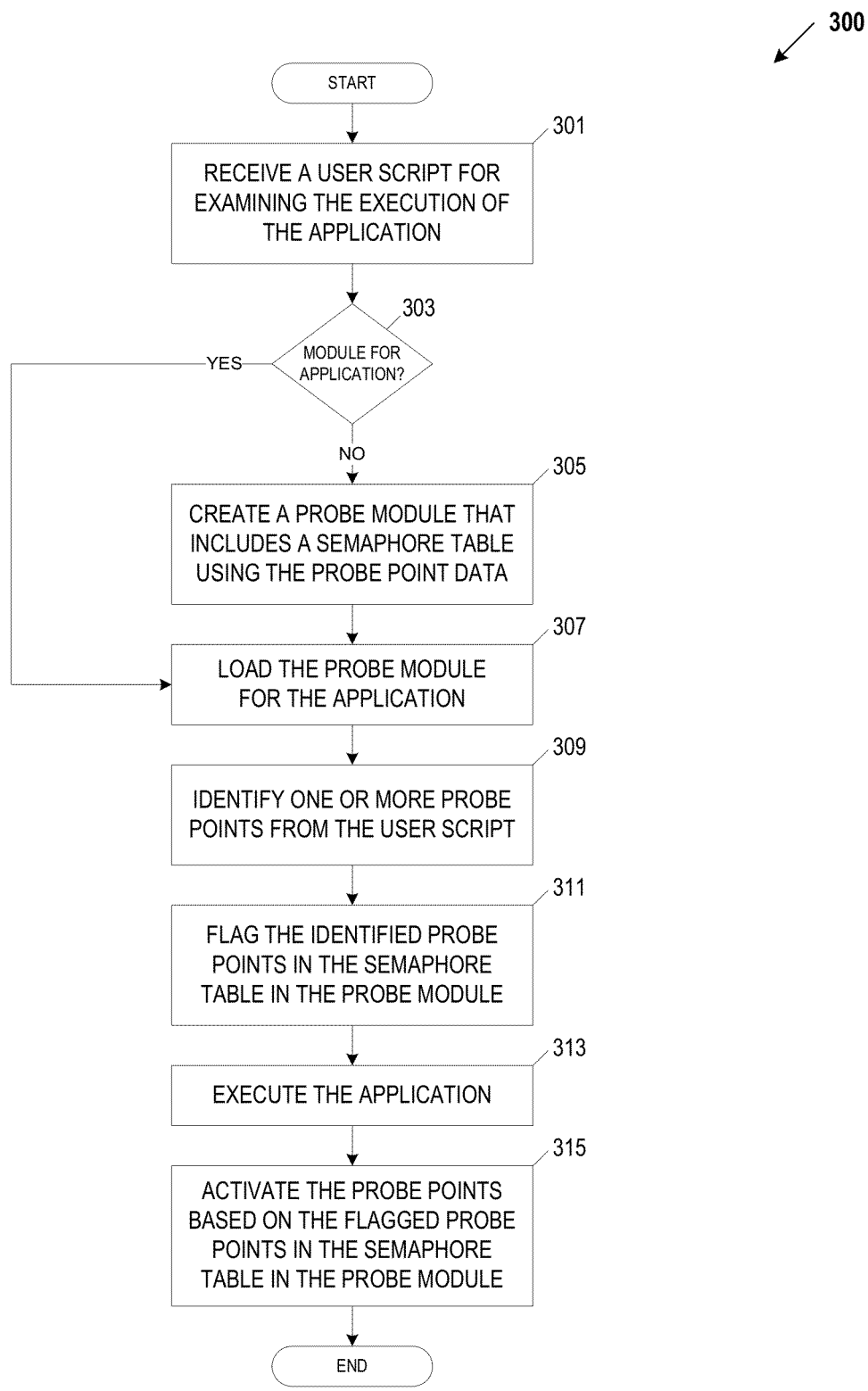
FIG. 3 is a flow diagram of one embodiment of a method for managing the activation of probe points using semaphore variables.

FIG. 3 is a flow diagram of one embodiment of a method 300 for managing the activation of probe points using semaphore variables. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the probe management system 140 in the computing and introspection system 100 of FIG. 1.

In one embodiment, the method 300 starts with a computing and introspection system executing an introspection tool to examine the execution of a user application. At block 301, the probe management system receives a user script for examining a user application and identifies the application that is to be examined from the user script. The system can obtain a user script from a data store or a user script that is submitted by a user using an introspection user interface. For example, the system may receive a user script and may identify that a MySQL® application is to be examined.

At block 303, the probe management system can determine whether there is an introspection tool probe module (probe module) for the application stored in a data store that is coupled to the system. If there is a probe module for an application already stored in the data store, the method continues to block 309. If there is not a probe module for an application already stored in the data store (block 303), the system can create a semaphore table and a probe module that includes the semaphore table using the collected probe point data at block 305. The system can store the probe module in the data store. The semaphore table includes a semaphore variable value for each probe point in an application. One embodiment of a method for creating a probe module for an application is described in greater detail below in conjunction with FIG. 4.

At block 307, the probe management system loads the probe module that corresponds to the application. At block 309, the system identifies one or more probe points in the user script that are to be activated. The user script includes functions (e.g., probe functions) that identify probe points in the application code that are to be examined. A user may not wish to examine all of the probe points in an application and may only include a subset of the probe points in the application in the script. At block 311, the probe management system flags the probe points, which are identified in the script, in the semaphore table in the probe module. One embodiment of a method for flagging the identified probe points in a semaphore table is described in greater detail below in conjunction with FIG. 5.

At block 313, the system executes the application under control of the introspection tool. At block 315, the system causes the application to activate the probe points based on the flagged probe points in the semaphore table. Probe points that are not defined in the user script remain dormant, which can help reduce an application's overhead in activating the probe points. Probe points that are activated for use allow an introspection tool to attach to the probe point and control the application at the probe point.

Figure 4:
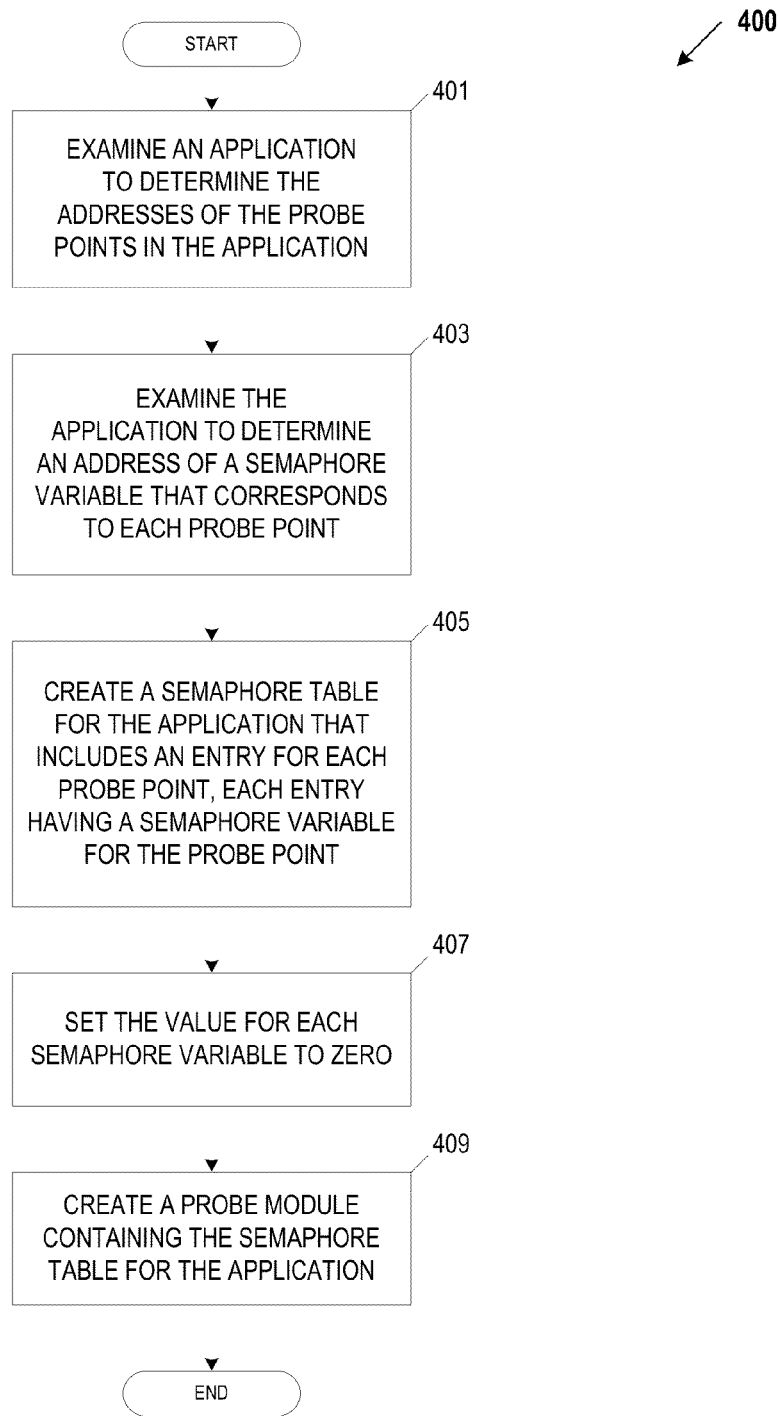
FIG. 4 is a flow diagram of one embodiment of a method for creating an introspection tool probe module for an application for managing the application's probe points.

FIG. 4 is a flow diagram of one embodiment of a method 400 for creating an introspection tool probe module for an application for managing the application's probe points. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the probe management system 140 in the computing and introspection system 100 of FIG. 1.

In one embodiment, the method 400 starts with a computing and introspection system executing an introspection tool to examine the execution of an application. The probe management system receives a user script and identifies an application that is to be examined from the user script. For example, the system may identify from a user script that a MySQL® application is to be examined. The system determines that there is not a probe module for the user application already stored in a data store.

At block 401, the probe management system examines the probe description table of the user application, such as MySQL®, to determine the addresses in the application of all of the probe points that are in the application. At block 403, the probe management system examines the application's probe description table to determine the addresses of semaphore variables that correspond to the probe points.

At block 405, the probe management system creates a semaphore table to manage the activation of the probe points using the address data for the probe points and the address data for the semaphore variables. The semaphore table includes an entry for each probe point in the application. An entry can include the address of the probe point, the address of the semaphore variable that corresponds to the probe point, and a field for a value for the semaphore variable.

At block 407, the probe management system sets the initial value for each semaphore variable to, for example, a zero value. Subsequently, the probe management system can adjust (e.g., increment) the semaphore variable values to represent to the application that a probe point is to be activated for use. One embodiment of managing the probe point activation using semaphore variables is described in greater detail below in conjunction with FIG. 5.

At block 409, the probe management system creates a probe module for the application that includes the semaphore table for the application. The probe module is a static module which the introspection tool executes to activate the probe points that are identified in a user script. The probe management system can store module code templates for different user application types in a data store. A module code template is a set of instructions for using a semaphore table.

At block 409, the system can combine a module code template, which corresponds to the application that is being examined, with the semaphore table for the application to create the probe module for the application. For example, the probe management system can create a probe module for the MySQL® application by combining the module code template for the MySQL® application with the MySQL® semaphore table which was created at block 405. Subsequently, when the application is run under control of an introspection tool, the probe management system can use the probe module for the application to cause the application to activate only the probe points that a user is interested in examining.

Figure 5:
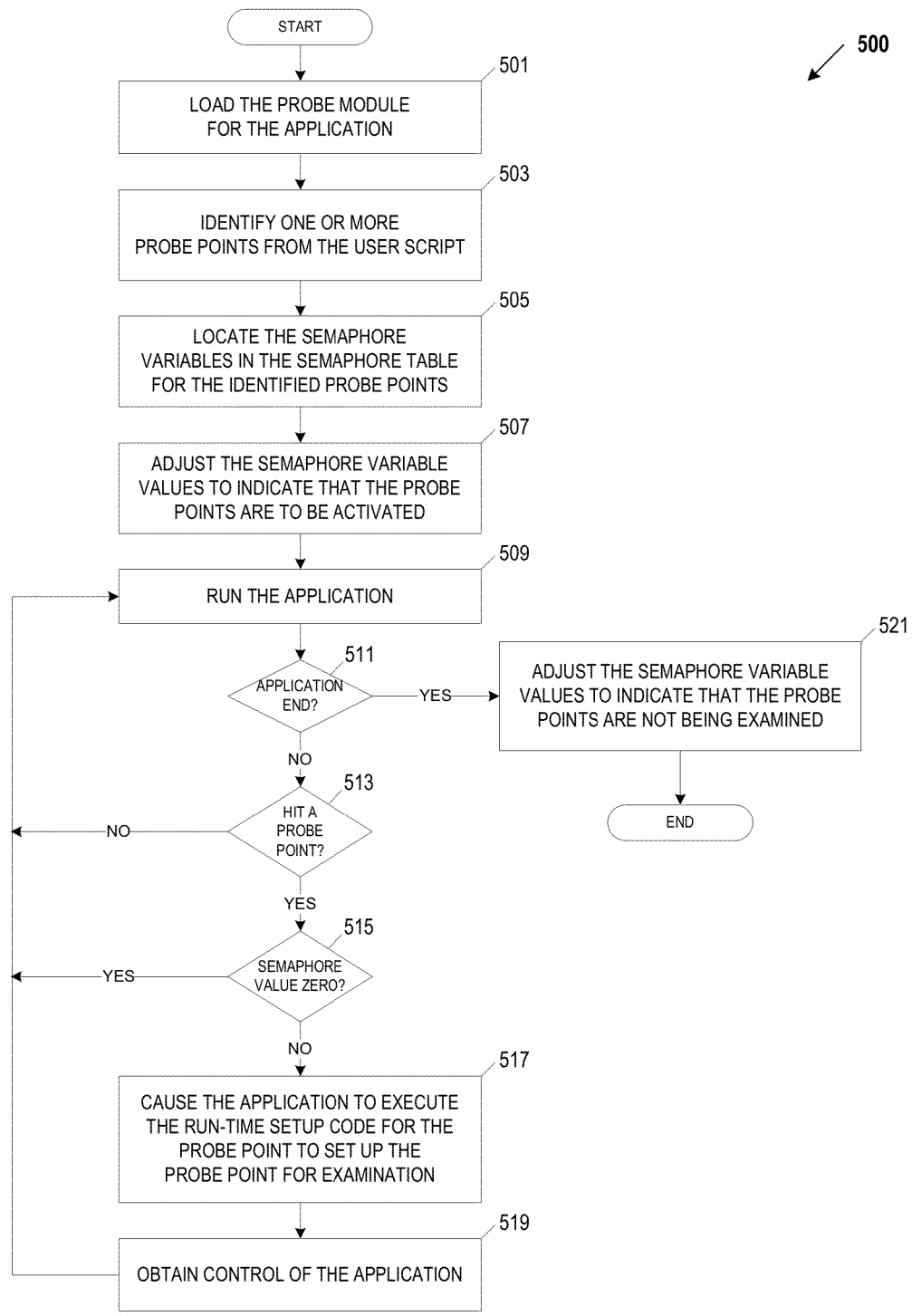
FIG. 5 is a flow diagram of one embodiment of a method for using semaphore variables to control the activation of probe points in an application.

FIG. 5 is a flow diagram of one embodiment of a method 500 for using semaphore variables to manage the activation of probe points in an application. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the probe management system 140 in the computing and introspection system 100 of FIG. 1.

In one embodiment, the method 500 starts with a computing and introspection system executing an introspection tool to examine the execution of an application. The probe management system has received a user script for examining an application and has created and stored, and/or identified a probe module for the application for managing the activation of the probe points in the application. For example, the probe management system identifies from the user script that the application to be examined is a MySQL® application and has created and stored, and/or identified the probe module for the MySQL® application in a data store. The probe module includes a semaphore table for the application that includes a semaphore variable value for each probe point in the application.

At block 501, the probe management system searches the data store for the probe module for the application and loads the probe module. For example, the system locates the probe module for the MySQL® application in the data store and loads the MySQL® probe module.

At block 503, the probe management system identifies one or more probe points in the user script which are to be activated. A user can include probe functions in a user script that identify the probe points of interest. The probe points that are included in the user script are the probe points that are to be dynamically activated when the application is run under control of an introspection tool. The probe points of an application that are not included in a user script are the probe points that a user is not interested in examining and remain dormant when the application is run under control of an introspection tool. For example, MySQL® software developers may have embedded hundreds of probe points in the MySQL® application code. A system administrator may write a user script that includes probe functions for examining 25 probe points in the MySQL® application at PROBEPOINT_1 to PROBE- POINT_25 and the probe management system identifies the 25 probe points from the user script.

At block 505, the system searches the semaphore table in the probe module and locates the entries that correspond to the probe points that are identified from the user script. The system can use a probe point identifier, such as a probe point address, to locate the entries in the semaphore table that correspond to the probe points in the user script. For example, the probe management system uses probe point address data to locate the entries in the semaphore table that correspond to PROBEPOINT_1 to PROBEPOINT_25.

An entry in the semaphore table can include a numerical field to store a semaphore variable value. A semaphore variable value may have an initial value of zero which indicates that no instrumentation session is in progress for the corresponding probe point. A probe point that is not to be monitored will not be activated by the application. At block 507, the system adjusts the semaphore variable values in the entries that correspond to the identified probe points to flag these probe points as the probe points which the application is to activate. The probe management system can increment the current values (e.g., zero) by one to represent to an application that the application is to set up these particular probe points for use. For example, the probe management system increments the semaphore variable values in the entries for PROBEPOINT_1 to PROBEPOINT_25 in the semaphore table to represent to the MySQL® application that the MySQL® application is to set up PROBEPOINT_1 to PROBEPOINT_25 to allow the system to attach to PROBEPOINT_1 to PROBEPOINT_25.

An application's probe points may be used by more than one introspection tool. For example, there may be multiple concurrent instrumentation sessions (e.g, SystemTap sessions) that are running and examining the same probe points in a MySQL® application. In such a case, the current value for a semaphore variable may already be a non-zero value which indicates that the probe point is to be activated or is already active and being examined by one of the SystemTap instrumentation sessions. Multiple instrumentation sessions (e.g., multiple SystemTap sessions), each of which is accessing the same application, can each run its own probe modules. Each probe module can access the same semaphore variables and can adjust the same semaphore variable values to represent to an application that the probe point is being examined by at least one of the multiple instrumentation sessions. For example, a first SystemTap instrumentation session may be examining a MySQL® application and may have incremented the semaphore variable value for PROBEPOINT_1 using its probe module for the MySQL® application from zero to one. A second SystemTap instrumentation session may also be examining PROBEPOINT_1 in the MySQL® application and can increment the same semaphore variable value for PROBEPOINT_1 using its probe module for the MySQL® application from one to two.

At block 509, the probe management system runs the application under control of the introspection tool. At block 511, the system determines whether this particular instrumentation session for the application is complete. For example, the probe management system can determine that the introspection tool is finished probing all of the probe points that are identified in the user script. If the instrumentation session for the application is complete (block 511), the system continues to block 521. If the instrumentation session for the application is not complete (block 511), the probe management system determines whether the application has 'hit' a probe point at block 513. An introspection tool is notified by the application and/or the operating system kernel when the application 'hits' a probe point.

If the application has not 'hit' a probe point (block 513), the application continues to run at block 509. If the application has 'hit' a probe point (block 513), the application determines whether the semaphore variable value for the probe point that is 'hit' has a zero value in the semaphore table at block 515. The application can detect an identifier that identifies the probe point that was 'hit'. An example of an identifier can be the address in the application of the probe point. The application can search the semaphore table entries for an entry that has address data that matches the address data identifier.

At block 515, if the semaphore variable value in the matching entry is a zero value, the probe management system does not cause the application to set up that probe point. A semaphore variable having a zero value indicates that there is no instrumentation session in progress for this probe point. The application bypasses execution of the run-time probe setup code for the probe point and continues to run at block 509.

A semaphore variable having a non-zero value indicates that the probe point is flagged to be activated or to remain being active in the case where multiple instrumentation sessions may be running. At block 515, if the semaphore variable value is a not a zero value, the application sets up the probe point for examination at block 517. The application executes the run-time probe setup code for the probe point to store the incoming probe point arguments in registers or on the stack, in, for example, a data store, which the introspection tool can subsequently access. A probe point may already be set up for examination at block 517. For example, the incoming probe point arguments may be already stored in a data store because there are multiple instrumentation sessions examining the same probe point or there is a single introspection tool session examining the particular probe point multiple times. In any case, if the probe point is already set up for examination, the probe point remains set up for examination at block 517 and the method continues to block 519.

At block 519, the probe management system obtains control of (attaches to) the application at the probe point and handles the probe point according to the function commands in the user script, such as examination and analysis operations. When the probe management system is finished performing the actions associated with the probe point at block 519, the probe management system relinquishes control of the application back to the application and continues to allow the application to run at block 509.

When an instrumentation session for the application is complete (block 511), the probe management session adjusts the semaphore variable values for the probe points, which were previously incremented at block 507, to represent to an application that the probe points are no longer being examined by the particular instrumentation session at block 521. For example, the probe management system can decrement the semaphore variable values for the probe points that the probe management system had previously incremented. The adjusted (e.g., decremented) semaphore variable values for the identified probe points represent that this particular instrumentation session is no longer examining the identified probe points.

Using the example above of a first and second SystemTap instrumentation session examining PROBEPOINT_1 in a MySQL® application, the current semaphore variable value for the PROBEPOINT_1 has a value of two. When the first SystemTap instrumentation session has finished examining PROBEPOINT_1, the probe management system for the first SystemTap instrumentation session decreases the semaphore variable value from two to one to indicate that the first SystemTap instrumentation session is no longer examining PROBEPOINT_1. There still remains, however, the second SystemTap instrumentation session that is examining PROBEPOINT_1. When the second SystemTap instrumentation session has finished examining PROBEPOINT_1, the probe management system for the second SystemTap instrumentation session decreases the semaphore variable value from one to zero to indicate that PROBEPOINT_1 is not being examined by any SystemTap instrumentation session. The zero semaphore variable value for PROBEPOINT_1 represents that PROBEPOINT_1 is currently a dormant probe point.

Figure 6:
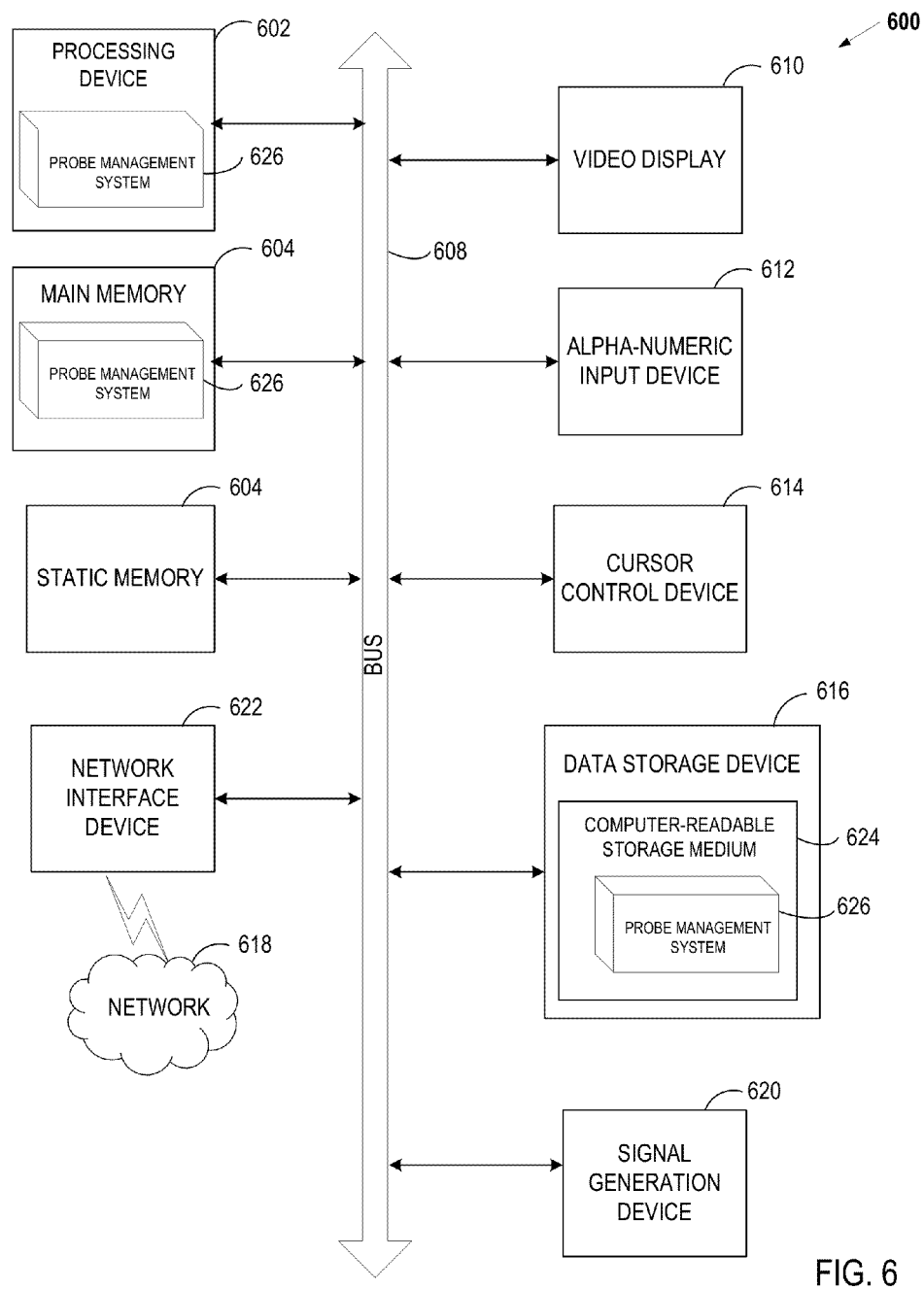
FIG. 6 is a diagram of one embodiment of a computer system for a probe management system.

FIG. 6 is a diagram of one embodiment of a computer system for dynamically activating probe points using a probe module. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, registers 628, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 can contain several kinds of registers, such as address registers 628. Address registers 628 can hold addresses that may be instructions that indirectly access memory. Processing device 602 is configured to execute the probe management system 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the probe management system 626) embodying any one or more of the methodologies or functions described herein. The probe management system 626 may also reside, completely or at least partially, within the main memory 604 and/or within the processing device 602 during execution thereof by the computer system 600, the main memory 604 and the processing device 602 also constituting machine-readable storage media. The probe management system 626 may further be transmitted or received over a network 618 via the network interface device 622.

The computer-readable storage medium 624 may also be used to store the probe management system 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The probe management system 626, components and other features described herein (for example in relation to FIG. 1) can be implemented as discrete hardware components or integrated in the functionality of hardware components such as ASICS, FPGAs, DSPs or similar devices. In addition, the probe management system 626 can be implemented as firmware or functional circuitry within hardware devices. Further, the probe management system 626 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "adjusting", "incrementing", "activating", "examining", "loading", "locating", "detecting", "determining", "decrementing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for using semaphore variables to manage the activation of probe points in an application has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
   identifying, by an introspection tool executed by a processing device, a probe module for an application, the probe module comprising a semaphore table comprising a plurality of entries for a plurality of probe points in the application, the plurality of entries comprising a plurality of semaphore variable values for the plurality of probe points;
   identifying, by the introspection tool, from an introspection user script, one of the plurality of probe points that is to be activated, wherein the introspection user script defines execution of the application at the one of the plurality of probe points in the application;
   adjusting, by the introspection tool, one of the plurality of semaphore variable values that corresponds to the one of the plurality of probe points in the semaphore table in the probe module to represent to the application that the one of the plurality of probe points is to be activated; and
   causing, by the introspection tool, the application to activate the one of the plurality of probe points based on the adjusted semaphore variable value in the semaphore table.

2. The method of claim 1, wherein identifying the probe module comprises:
   identifying from the introspection user script the application to be examined;
   searching a data store to locate the probe module for the application;
   determining that the probe module for the application is not in the data store;
   examining the application to determine probe point data for the plurality of probe points in the application, wherein the probe point data comprises addresses of the plurality of probe points and addresses of a plurality of semaphore variables that correspond to the plurality of probe points;
   creating the probe module for the application using the probe point data; and
   storing the probe module for the application in the data store.

3. The method of claim 1, wherein identifying the probe module comprises:
   identifying from the introspection user script the application to be examined;
   searching a data store to locate the probe module for the application; and
   locating the probe module for the application in the data store.

4. The method of claim 1, wherein the plurality of entries in the semaphore table further comprise addresses of the plurality of probe points and addresses of a plurality of semaphore variables for the plurality of probe points.

5. The method of claim 4, wherein the plurality of semaphore variables for the plurality of probe points in the semaphore table comprise initial values of zero.

6. The method of claim 1, wherein adjusting the one of the plurality of semaphore variable values comprises:
   loading the probe module for the application;
   locating the one of the plurality of semaphore variable values in the semaphore table that corresponds to the one of the plurality of probe points, wherein the one of the plurality of semaphore variable values comprises a current value; and
   incrementing the current value to represent to the application that the one of the plurality of probe points is to be activated.

7. The method of claim 1, wherein activating the one of the plurality of probe points comprises:
   detecting the one of the plurality of probe points during execution under control of the introspection tool;
   locating the one of the plurality of semaphore variable values in the semaphore table that corresponds to the one of the plurality of probe points;
   determining that the current value of the one of the plurality of semaphore variables is a non-zero value; and executing run-time probe setup code for the one of the plurality of probe points to allow the introspection tool to attach to the one of the plurality of probe points.

8. The method of claim 1, further comprising:
determining the one of the plurality of probe points is not being examined during an instrumentation session; and
decrementing the one of the plurality of semaphore variable values that corresponds to the one of the plurality of probe points to represent that the one of the plurality of probe points is not being examined.

9. A system comprising:
a persistent storage unit to store an introspection user script, wherein the introspection user script defines execution of an application at one or more of a plurality of probe points in the application; and
a processing device coupled to the persistent storage unit to
identify a probe module for the application, the probe module comprising a semaphore table comprising a plurality of entries for the plurality of probe points in the application, the plurality of entries comprising a plurality of semaphore variable values for the plurality of probe points,
identify, from the introspection user script, one of the plurality of probe points that is to be activated;
adjust one of the plurality of semaphore variable values that corresponds to the one of the plurality of probe points in the semaphore table in the probe module to represent to the application that the one of the plurality of probe points is to be activated, and
cause the application to activate the one of the plurality of probe points based on the adjusted semaphore variable value in the semaphore table.

10. The system of claim 9, wherein the processing device is to identify the probe module by:
identifying from the introspection user script the application to be examined,
searching the persistent storage unit to locate the probe module for the application,
determining that the probe module for the application is not in the persistent storage unit,
examining the application to determine probe point data for the plurality of probe points in the application, wherein the probe point data comprises addresses of the plurality of probe points and addresses of a plurality of semaphore variables that correspond to the plurality of probe points,
creating the probe module for the application using the probe point data, and
storing the probe module for the application in the persistent storage unit.

11. The system of claim 9, wherein the processing device is to identify the probe module by:
identifying from the introspection user script the application to be examined,
searching the persistent storage unit to locate the probe module for the application, and
locating the probe module for the application in the persistent storage unit.

12. The system of claim 9, wherein the processing device is to adjust the one of the plurality of semaphore variable values by:
loading the probe module for the application;
locating the one of the plurality of semaphore variable values in the semaphore table that corresponds to one of the plurality of probe points, wherein the one of the plurality of semaphore variable values comprises a current value; and
incrementing the current value to represent to the application that the one of the plurality of probe points is to be activated.

13. The system of claim 9, wherein the processing device is to activate the one of the plurality of probe points by:
detecting the one of the plurality of probe points during execution under control of the introspection tool;
locating the one of the plurality of semaphore variable values in the semaphore table that corresponds to the one of the plurality of probe points;
determining that the current value of the one of the plurality of semaphore variables is a non-zero value; and
executing run-time probe setup code for the one of the plurality of probe points to allow the introspection tool to attach to the one of the plurality of probe points.

14. The system of claim 9, wherein the processor is further to:
determine the one of the plurality of probe points is not being examined during an instrumentation session; and
decrement the one of the plurality of semaphore variable values that corresponds to the one of the plurality of probe points to represent that the one of the plurality of probe points is not being examined.

15. A non-transitory computer-readable storage medium including instructions that, when executed by a processing device, cause the processing device to perform operations comprising:
identifying a probe module for an application, the probe module comprising a semaphore table comprising a plurality of entries for a plurality of probe points in the application, the plurality of entries comprising a plurality of semaphore variable values for the plurality of probe points;
identifying, by the processing device, from an introspection user script, one of the plurality of probe points that is to be activated, the introspection user script defines execution of the application at the one of the plurality of probe points in the application;
adjusting one of the plurality of semaphore variable values that corresponds to the one of the plurality of probe points in the semaphore table in the probe module to represent to the application that the one of the plurality of probe points is to be activated; and
causing the application to activate the one of the plurality of probe points based on the adjusted semaphore variable value in the semaphore table.

16. The non-transitory computer-readable storage medium of claim 15, wherein identifying the probe module comprises:
identifying from the introspection user script the application to be examined;
searching a data store to locate the probe module for the application;
determining that the probe module for the application is not in the data store;
examining the application to determine probe point data for the plurality of probe points in the application, wherein the probe point data comprises addresses of the plurality of probe points and addresses of a plurality of semaphore variables that correspond to the plurality of probe points;
creating the probe module for the application using the probe point data; and
storing the probe module for the application in the data store.

17. The non-transitory computer-readable storage medium of claim 15, wherein identifying the probe module comprises:

identifying from the introspection user script the application to be examined;

searching a data store to locate the probe module for the application; and locating the probe module for the application in the data store.

18. The non-transitory computer-readable storage medium of claim 15, wherein adjusting the semaphore variable values comprises:

loading the probe module for the application;

locating the one of the plurality of semaphore variable values in the semaphore table that corresponds to the one of the plurality of probe points, wherein the one of the plurality of semaphore variable values comprises a current value; and incrementing the current value to represent to the application that the one of the plurality of probe points is to be activated.

19. The non-transitory computer-readable storage medium of claim 15, wherein activating the one of the plurality of probe points comprises:

detecting the one of the plurality of probe points during execution under control of the introspection tool;

locating the one of the plurality of semaphore variable values in the semaphore table that corresponds to the one of the plurality of probe points;

determining that the current value of the one of the plurality of semaphore variables is a non-zero value; and executing run-time probe setup code for the one of the plurality of probe points to allow the introspection tool to attach to the one of the plurality of probe points.

20. The non-transitory computer-readable storage medium of claim 15, further comprising:

determining the one of the plurality of probe points is not being examined during an instrumentation session; and decrementing the one of the plurality of semaphore variable values that corresponds to the one of the plurality of probe points to represent that the plurality of probe points is not being examined.

* * * * *